(12) United States Patent
Hong

(10) Patent No.: US 7,106,183 B2
(45) Date of Patent: Sep. 12, 2006

(54) REARVIEW CAMERA AND SENSOR SYSTEM FOR VEHICLES

(75) Inventor: Suk Ki Hong, Tustin, CA (US)

(73) Assignee: NESA International Incorporated, Santa Fe Springs, CA (US)

( * ) Notice: Subject to any disclaimer, the term of this patent is extended or adjusted under 35 U.S.C. 154(b) by 156 days.

(21) Appl. No.: 10/926,052

(22) Filed: Aug. 26, 2004

(65) Prior Publication Data

US 2006/0044160 A1 Mar. 2, 2006

(51) Int. Cl.
*B60Q 1/00* (2006.01)

(52) U.S. Cl. ............ 340/435; 340/436; 340/932.2; 340/903; 340/904; 340/686.1; 340/686.2; 340/958; 348/148; 348/169; 348/174

(58) Field of Classification Search .......... 340/435, 340/436, 932.2, 903, 904, 686.1, 686.2, 958; 348/148, 169, 174
See application file for complete search history.

(56) References Cited

U.S. PATENT DOCUMENTS

| | | | | |
|---|---|---|---|---|
| 5,574,426 A | * | 11/1996 | Shisgal et al. | 340/435 |
| 5,980,048 A | * | 11/1999 | Rannells et al. | 359/843 |
| 6,021,373 A | * | 2/2000 | Zuercher et al. | 701/300 |
| 6,693,524 B1 | * | 2/2004 | Payne | 340/463 |
| 6,911,997 B1 | * | 6/2005 | Okamoto et al. | 348/148 |
| 7,005,974 B1 | * | 2/2006 | McMahon et al. | 340/435 |

* cited by examiner

*Primary Examiner*—Tai Nguyen
(74) *Attorney, Agent, or Firm*—Jenkens & Gilchrist, P.C.

(57) ABSTRACT

A rearview system component for a vehicle including a housing for attachment to the vehicle, a camera positioned in the housing to have a first axial direction, a first sensor positioned in the housing to have a second axial direction, and a second sensor positioned in the housing to have a third axial direction, wherein the first, second and third axial directions are in different directions.

30 Claims, 5 Drawing Sheets

REARVIEW CAMERA AND SENSOR SYSTEM FOR VEHICLES

BACKGROUND OF THE INVENTION

1. Field of the Invention

The present invention relates to a rearview system for vehicles, and more particularly, to a rearview camera and sensor system for vehicles.

2. Discussion of the Related Art

In general, a camera or a sensor is used to detect an object behind vehicles. Typically, large vehicles, such as SUVs, or vehicles with trailers have a large blind spot behind them. Regardless of whether a mirror is used, a driver can have difficulties in judging distances between an object and the rear of a vehicle. A rearview camera is used to visually detect an object and a rearview sensor is used to electronically detect an object.

A rearview camera gives a clear indication of an object behind the vehicle as well as the relative location of the object behind the vehicle. However, a camera's perspective of an object does not clearly convey the distance of the object. In addition, a camera's field of view can have such a wide field of view such that the image is distorted. A non-distorted image can be generated if camera's field of view is very narrow to generate.

A rearview sensor, such as an infrared or sonic sensor, can accurately determine the distance of an object only within a field of view that is significantly less than 180°. Thus, there can be blind spots even when a sensor is used. Further, a sensor can not indicate the actual location of an object behind a vehicle. In other words, a sensor indicates the presence of an object within the field of view for the sensor but does not indicate where the object is located in the field of view.

SUMMARY OF THE INVENTION

Accordingly, the present invention is directed to a rearview camera and sensor system for vehicles that substantially obviates one or more of the problems due to limitations and disadvantages of the related art.

An object of the present invention is to provide a rearview camera and sensor system for vehicles having a camera and sensors.

Another object of the present invention is to provide a rearview camera and sensor system for vehicles that integrates the use of a camera and sensors.

Another object of the present invention is to provide a rearview camera and sensor system for vehicles that determines distance of an object over a wide field of view.

Another object of the present invention is to provide a rearview camera and sensor system for vehicles that determines a location of an object.

Another object of the present invention is to provide a rearview camera and sensor system for vehicles that determines a closure rate of an object.

Another object of the present invention is to provide a rearview camera and sensor system for vehicles that determines speed of an object.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a rearview system component for a vehicle including a housing for attachment to the vehicle, a camera positioned in the housing to have a first axial direction, a first sensor positioned in the housing to have a second axial direction, and a second sensor positioned in the housing to have a third axial direction, wherein the first, second and third axial directions are in different directions.

In another aspect, A system for viewing a rearview image and object information includes: a housing for attachment to a vehicle; a camera positioned in the housing to have a first axial direction; a first sensor positioned in the housing to have a second axial direction; a second sensor positioned in the housing to have a third axial direction, wherein the first, second and third axial directions are in different directions; a sensor video control connected to the camera and for generating a video signal with object data for an object within a field of view and in range of at least one of the first and second sensors; and a display for viewing a rearview image and object information from the video signal with object data.

In yet another aspect, a process for viewing a rearview image and object information includes: receiving signals from a camera and at least first and second sensors; calculating object data with regard to an object within a field of view and in range of at least one of the first and second sensors; generating a video signal with object data relevant to the object; and displaying a rearview image with object information on a display.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1b is a side view of the first exemplary embodiment shown in FIG. 1a.

FIG. 2 is a diagram of the axial directions for the sensors and the camera in the first exemplary embodiment shown in FIG. 1a.

DETAILED DESCRIPTION OF THE PREFERRED EMBODIMENTS

Reference will now be made in detail to the preferred embodiments of the present invention, examples of which are illustrated in the accompanying drawings.

Figure 1A:
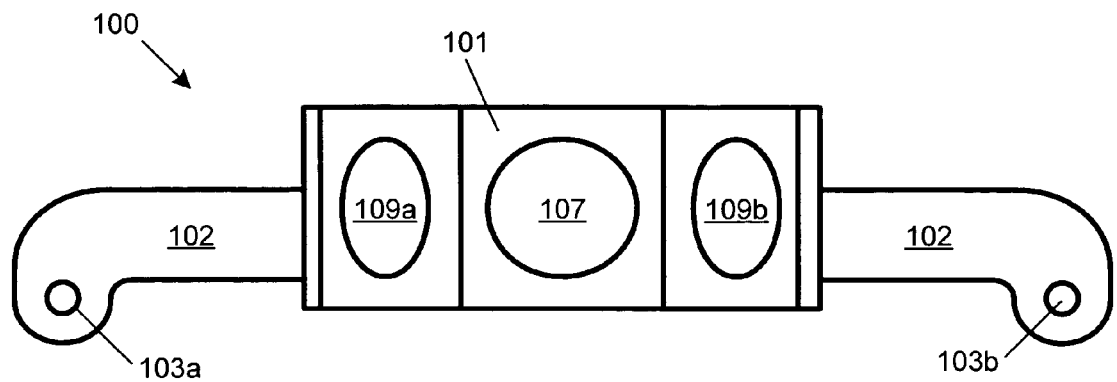
FIG. 1a is a plan view of a first exemplary embodiment of the present invention.

FIG. 1a is a plan view of a first exemplary embodiment of the present invention. More particularly, FIG. 1a illustrates a rearview system component 100 for a vehicle that includes a housing 101 containing a camera 107 and sensors 109a and 109b at opposite sides of the camera 107. The housing can be made of metal, plastic or other materials that can be molded, forged or shaped. The camera can be a black and white, or color camera. Preferably, the camera is a video camera. The sensors can be infrared, laser, radar or sonic transceivers. Such transceivers radiate an electromagnetic or sonic signal and then detect the reflection of such a signal off of the object.

Figure 1B:
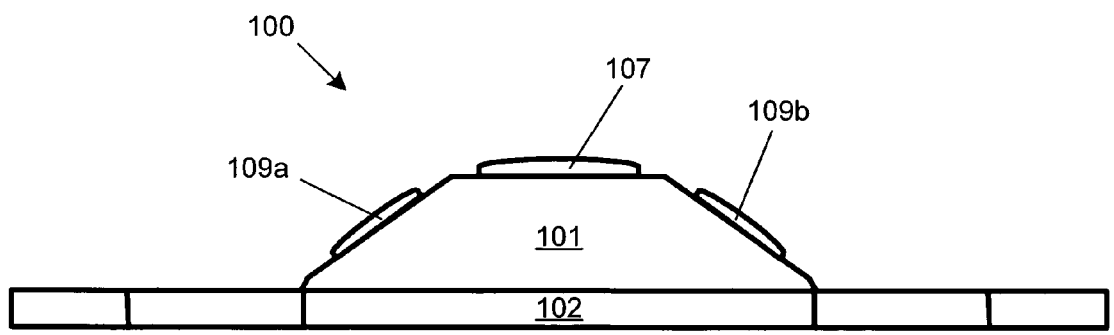

FIG. 1b is a side view of the first exemplary embodiment shown in FIG. 1a. As shown in FIGS. 1a and 1b, the housing 101 is on a plate 102. The housing 101 can be mounted on the plate 102 or the plate 102 can be integral to the housing 101 as a single body. The plate 102 can be made of metal, plastic or other materials that can be molded, forged or shaped. As shown in FIG. 1a, the plate 102 can have holes 103a and 103b, which correspond to attachment points on a vehicle for a vehicle identification placard. In the alternative, the plate 102 can have frame shape that will surround a vehicle identification placard and have holes, which correspond to attachment points on a vehicle for a vehicle identification placard.

Figure 2:
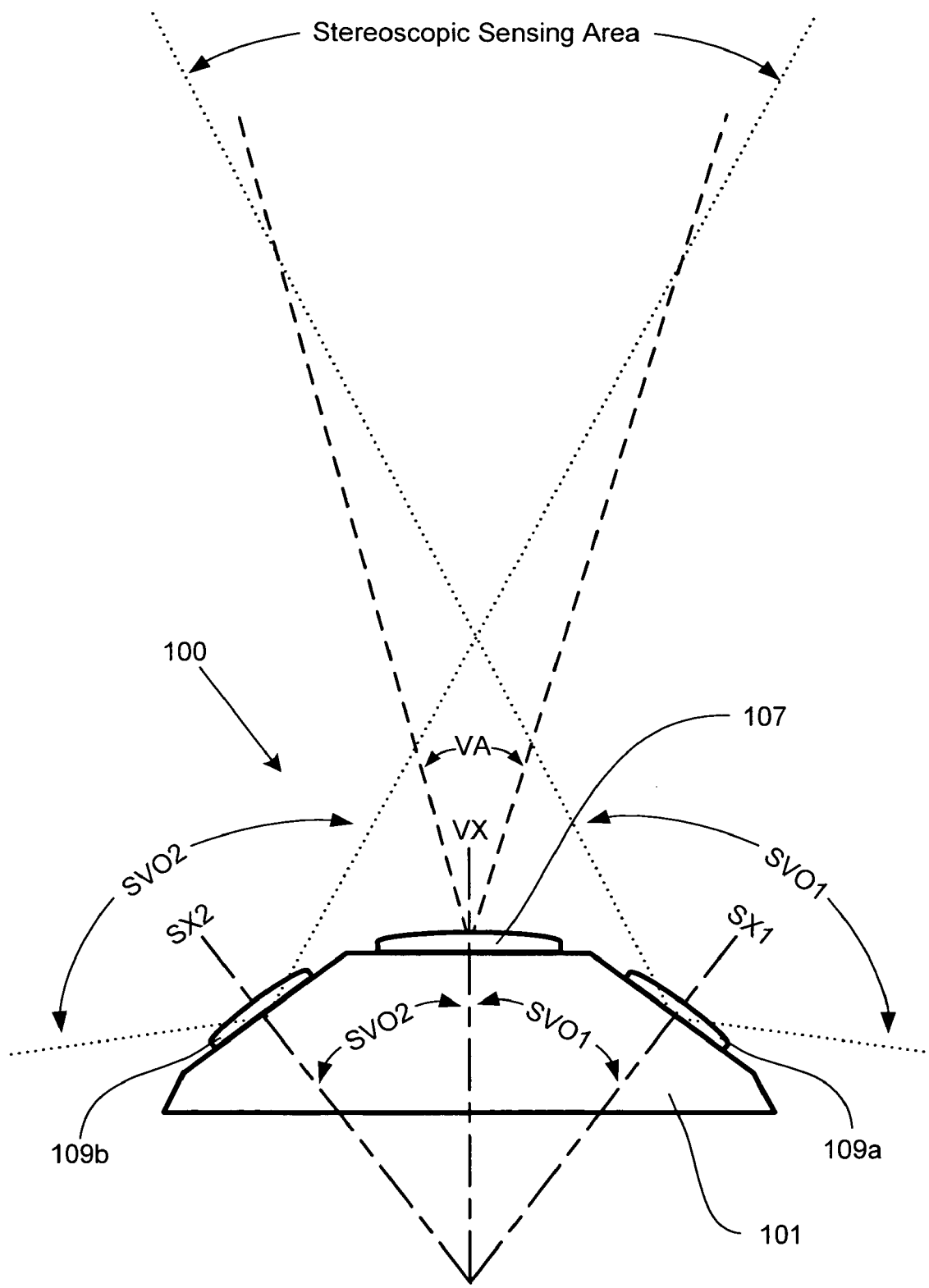

FIG. 2 is a diagram of the axial directions for the sensors and the camera in the first exemplary embodiment shown in FIG. 1a. As shown in FIG. 2, the rearview system component 100 has a camera 107 fixed in a video axial direction VX and sensors 109a and 109b having sensor axial directions SX1 and SX2. All of the sensor axial directions SX1 and SX2 are in different directions. Further, the video axial direction VX is in a different axial direction from the sensor axial directions SX1 and SX2. A first angle SVO1 between the first sensor axial direction SX1 and the video axial direction VX, and a second angle SVO2 between the second sensor axial direction SX2 and the video axial direction VX are substantially equal. Although the sensor axial directions SX1 and SX2 are shown in FIG. 3 to be symmetric about the video axial direction VX, the angles SVO1 and SVO2 can be different from each other by about 10 degrees.

The cumulative field of view for the sensors 109a and 109b is greater than 180° as shown in FIG. 2 by the combination of angles SVO1 and SVO2. The fields of view for the sensors 109a and 109b are respectively represented by the angles SVO1 and SVO2. FIG. 2 also shows that fields of view for the sensors 109a and 109b, as represented by the angles SVO1 and SVO2, overlap such that there is a stereoscopic sensing area in which both sensors 109a and 109b can detect an object. Although FIG. 3 shows the viewing angle VA of the camera to be within the stereoscopic sensing area, the camera can have a viewing angle larger than the stereoscopic sensing area created by the sensors 109a and 109b.

Figure 3:
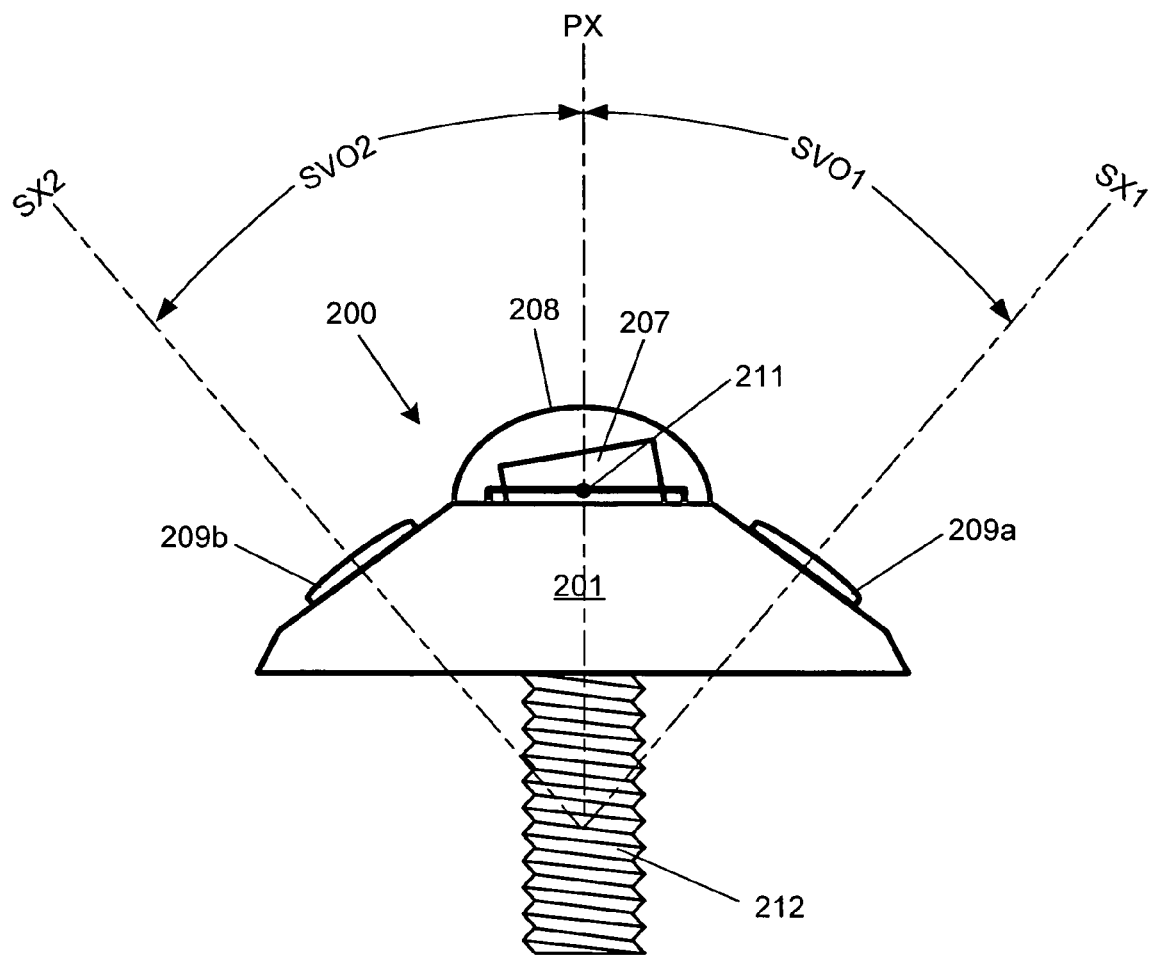
FIG. 3 is a side view of a second exemplary embodiment of the present invention.

FIG. 3 is a side view of a second exemplary embodiment of the present invention. More particularly, FIG. 3 illustrates a rearview system component 200 for a vehicle that includes a housing 201 containing a movable camera 207 and sensors 209a and 209b at the opposite sides of the camera 207. The movable camera 207 has a primary axial direction PX and can pivot toward the axial directions SX1 and SX2 of the sensors 209a and 209b.

The use of a movable camera enables the use of a camera having field of view that provides a clear image over a very wide field of view behind the vehicle. For example, if a camera having a 90° field of view is movable with a movement mechanism by +/−45°, the entire field of view can be covered behind a vehicle. In another example, a camera with a field of view of 120° that generates a less clear image can cover the entire field of view behind a vehicle with a movement mechanism that move the camera +/−30°.

The movable camera 207 pivots from side to side using a gimble 211. The camera 207 is moved with electrostatic, electromagnetic or piezoelectric type electromechanical forces. The electromechanical forces are used against springs that typically hold the movable camera in its primary axial direction. Further, the electromechanical forces used to move the camera to one side or the other can be used together to stabilize the camera along its primary axial direction. In an alternative to the gimble movement mechanism, the camera 207 can be mounted on a diaphragm that is sufficiently pliable to allow movement of the camera. A clear cover 208 can be positioned over the movable camera 207 to prevent dirt from entering the movement mechanism and impeding the movement of the movable camera 207.

The housing 201 of the rearview system component 200 shown in FIG. 3 can be mounted on a threaded cylinder 212. The housing 201 can be mounted on the threaded cylinder 212 or the threaded cylinder 212 can be integral to the housing 201 as a single body. The threaded cylinder 212 102 can be made of metal, plastic or other materials that can be molded, forged or shaped.

Figure 4:
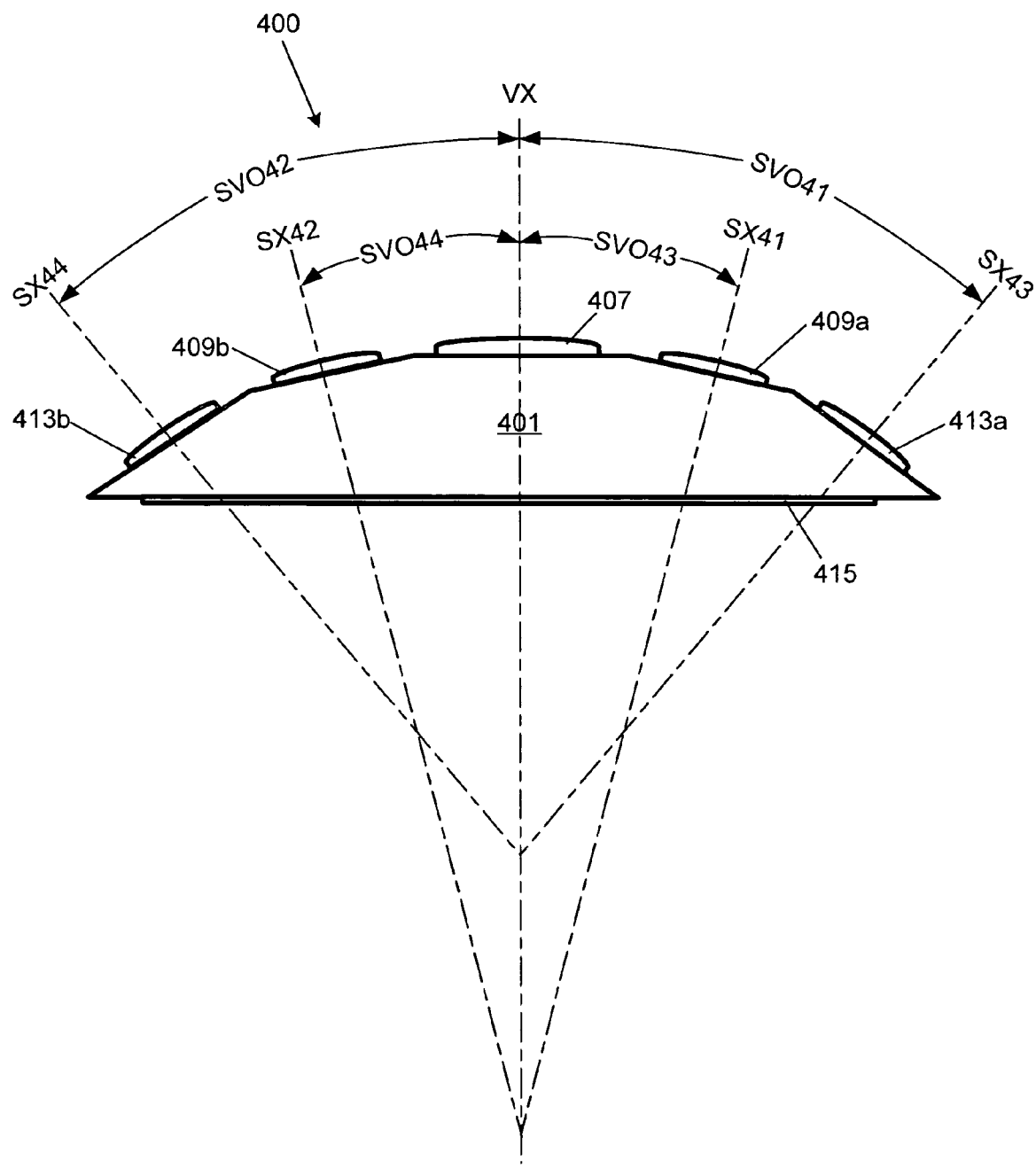
FIG. 4 is a side view of a third exemplary embodiment of the present invention.

FIG. 4 is a side view of a third exemplary embodiment of the present invention. More particularly, FIG. 4 illustrates a rearview system component 400 for a vehicle that includes a housing 401 containing a camera 407 and sensors 409a and 413a at one side of the camera 407 and sensors 409b and 413b on the other side of the camera. The housing 401 of the rearview system component 400 shown in FIG. 4 can be attached to a vehicle using an adhesive layer 415.

The camera 407 has a video axial direction VX while a first set of sensors 409a and 409b have a first pair of sensor axial directions SX41 and SX42 symmetric to the video axial direction VX of the camera 407, and second set of sensors 413a and 413b have a second pair of sensor axial directions SX43 and SX44 symmetric to the video axial direction of the fixed camera 407. All of the sensor axial directions SX41, SX42, SX43 and SX44 are in different directions. Further, the video axial direction VX is in a different axial direction from the sensor axial directions SX41, SX42, SX43 and SX44. Although the sensor axial directions SX41 and SX42 as well as the sensor axial directions SX43 and SX44 are shown in FIG. 4 to be symmetric with respect to the video axial direction VX, the angles SVO41 and SVO42 can be different from each other by about 10 degrees, and the angles SVO43 and SVO44 can also be different from each other by about 10 degrees.

Figure 5:
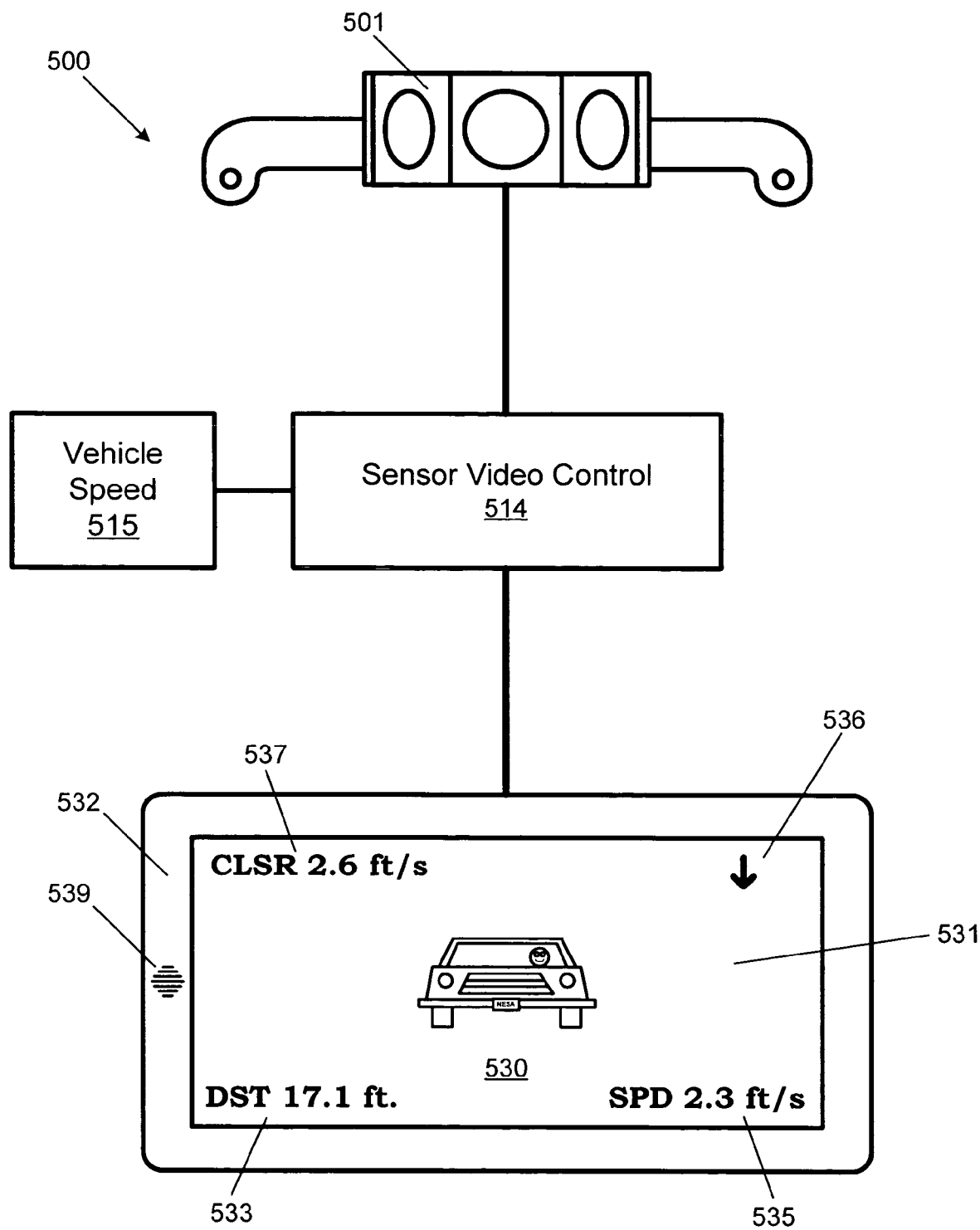
FIG. 5 is a system using the first exemplary embodiment shown in FIG. 1a that displays an image from the camera and other data.

FIG. 5 is a system using the first exemplary embodiment shown in FIG. 1a that displays an image from the camera and object data. FIG. 5 shows a system 500 including a rearview system component 501 having a camera, and first and second sensors similar to the rearview system component 100 in FIG. 1a, a sensor video control 514 and a display 530. The sensor video control 514 is connected to the camera and the sensors of the rearview system component 501.

Signals from the camera and the first and second sensors are received by the sensor video control 514. The signals from the sensors are indicative of reflected sonic or reflected electromagnetic signals received by the sensors. After calculations by the sensor video control 514, a video signal with object data relevant to an object within a field of view and in range of at least one of the first and second sensors is generated by the sensor video control 514. The display 530 is for viewing a rearview image and object information relevant to an object within a field of view and in range of at least one of the first and second sensors.

The sensor video control 514 implants object data into a video signal based on determinations made by the sensor video control using signals received from the first and second sensors. In other words, the sensor video control 514 generates a video signal with object data for an object within a field of view and in range of at least one of the first and second sensors. For example, the distance of an object can be calculated by the sensor video control 514 through signal return analysis of signals received from the first and second sensors. In another example, the sensor video control 514 calculates the closure rate of the object by the sensor video control 514 through distance measurements over a period of time or through doppler effect measurements in the signal return analysis of signals received from at least one of the first and second sensors. In a further example, the sensor video control 514 can calculate the speed of the object if the vehicle speed 515, as shown in FIG. 5, is input to the sensor video control 514 so that the object speed is calculated by adding the closure rate to the vehicle speed.

The sensor video control 514 can also provide an indication of where the object is located based on whether one or both of the first or second sensors detect the object. Thus, a rearview system component having two sensors can indicate whether an object is directly behind, behind on the left, or behind on the right. A rearview system component having four sensors can indicate five positions, such as behind on the left, behind slightly on the left, directly behind, behind slightly on the right, and behind on the right.

The sensor video control 514 can also be used to control the camera in a rearview system component. For example, the sensor video control 514 can control the focus of the camera to be in correspondence with the object distance. Thus, the camera is always in focus on the object. When the sensor video control 514 is used to control the focus of the camera, the sensor video control 514 is connected to a focusing motor on the camera.

Alternatively or in addition, the sensor video control 514 can be configured to control the direction of the camera in a rearview system component having a movable camera. In particular, the camera can be controlled by the sensor video control 514 such that the camera is directed toward where the sensor video control has determined where the object is located. Such movements of the camera increase the field of view in which objects can be viewed by the camera. When the sensor video control 514 is used to move the camera, the sensor video control 514 is connected to movement mechanisms on the camera.

The display 530 shown in FIG. 5 includes a display screen 531 within a frame 532. The display screen 531 can be a CRT or a flat panel display, such as an LCD. The display screen 531 displays an image of the object and object information, such as distance 533 of the object, speed 535 of the object, an indication of where the object is located 536 and closure rate 537 of the object. Such object information is based on object data calculated by the sensor video control 514. The frame 532 also includes an audible alarm 539 to indicate that the distance of an object is below a minimum safe distance.

It will be apparent to those skilled in the art that various modifications and variations can be made in the a rearview camera and sensor system for vehicles of the present invention without departing from the spirit or scope of the invention. Thus, it is intended that the present invention cover the modifications and variations of this invention provided they come within the scope of the appended claims and their equivalents.

What is claimed is:

1. A rearview system component for a vehicle, comprising:
    a housing for attachment to the vehicle;
    a camera positioned in the housing to have a first axial direction;
    a first sensor positioned in the housing to have a second axial direction; and
    a second sensor positioned in the housing to have a third axial direction, wherein the first, second and third axial directions are in different directions, and a cumulative field of view for the first and second sensors is greater than about 180°.

2. The rearview system component of claim 1, wherein the first and second sensors are on opposite sides of the camera.

3. The rearview system component of claim 1, wherein a first angle between the first and second axial directions, and a second angle between the first and third axially directions are substantially equal.

4. The rearview system component of claim 1, wherein the housing is on a plate having holes that correspond to attachment points on a vehicle for a vehicle identification placard.

5. The rearview system component of claim 4, wherein the plate is integral to the housing as a single body.

6. The rearview system component of claim 4, wherein the plate has a frame shape that can surround a vehicle identification placard.

7. The rearview system component of claim 1, wherein the camera is movable.

8. The rearview system component of claim 1, further comprising a third sensor having a fourth axial direction and a fourth sensor having a fifth axial direction, wherein both the fourth and fifth axial directions are different from both second and third axial directions.

9. The rearview system component of claim 8, wherein the third and fourth sensors are within the housing.

10. The rearview system component of claim 1, wherein the housing is mounted on an adhesive layer for attachment to a vehicle.

11. The rearview system component of claim 1, wherein the housing is attached to threaded cylinder for attachment to the vehicle.

12. The rearview system component of claim 11, wherein the threaded cylinder is integral to the housing as a single body.

13. A system for viewing a rearview image and object information, comprising:
    a housing for attachment to a vehicle;
    a camera positioned in the housing to have a first axial direction;
    a first sensor positioned in the housing to have a second axial direction;
    a second sensor positioned in the housing to have a third axial direction, wherein the first, second and third axial directions are in different directions;
    a sensor video control connected to the camera and for generating a video signal with object data for an object within a field of view and in range of at least one of the first and second sensors; and
    a display for viewing a rearview image and object information from the video signal with object data.

14. The system of claim 13, wherein the first and second sensors are on opposite sides of the camera.

15. The system of claim 13, wherein a first angle between the first and second axial directions, and a second angle between the first third axially directions are substantially equal.

16. The system component of claim 13, wherein the camera is movable.

17. The system of claim 13, further comprising a third sensor having a fourth axial direction and a fourth sensor having a fifth axial direction, wherein both the fourth and fifth axial directions are different than both second and third axial directions.

18. The system of claim 13, wherein the cumulative field of view of the first and second sensors is greater than about 180°.

19. The system of claim 13, wherein the object data includes the distance of the object.

20. The system of claim 13, wherein the object data includes the closure rate of the object.

21. The system of claim 13, wherein the object data includes speed of the object.

22. The system of claim 13, wherein the sensor video control connected to the camera and the sensors also controls the focus of the camera based upon the sensing of the first and second sensors.

23. The system of claim 13, wherein the sensor video control connected to the camera and the sensors also controls the direction of the camera based upon the sensing of the first and second sensors.

24. The system of claim 13, wherein the object data includes an indication of where the object is located.

25. A process for viewing a rearview image and object information, comprising:
   receiving signals from a camera and at least first and second sensors;
   calculating object data with regard to an object within a field of view and in range of at least one of the first and second sensors;
   generating a video signal with object data relevant to the object; and
   displaying a rearview image with object information on a display.

26. The process of claim 25, wherein the object data includes the distance of the object.

27. The process of claim 25, wherein the object data includes the closure rate of the object.

28. The process of claim 25, wherein the object data includes speed of the object.

29. The process of claim 25, wherein the object data includes an indication of where the object is located.

30. The process of claim 25, further comprising:
   moving the camera toward where the object is located.

* * * * *